United States Patent
Masoudipour et al.

(10) Patent No.: US 7,633,193 B2
(45) Date of Patent: Dec. 15, 2009

(54) THERMAL AND SECONDARY FLOW MANAGEMENT OF ELECTRICALLY DRIVEN COMPRESSORS

(75) Inventors: Mike M. Masoudipour, Rancho Palos Verdes, CA (US); Jeff A. Lotterman, Torrance, CA (US); Carol A. Oximberg, Los Angeles, CA (US); Michael S. Yang, Rancho Palos Verdes, CA (US)

(73) Assignee: Honeywell International Inc., Morristown, NJ (US)

( * ) Notice: Subject to any disclaimer, the term of this patent is extended or adjusted under 35 U.S.C. 154(b) by 420 days.

(21) Appl. No.: 11/624,046

(22) Filed: Jan. 17, 2007

(65) Prior Publication Data

US 2008/0168796 A1 Jul. 17, 2008

(51) Int. Cl.
  *H02K 9/00* (2006.01)
(52) U.S. Cl. .......................................... 310/54; 310/59
(58) Field of Classification Search ................... 310/52, 310/54, 55, 57, 58, 59, 64
  See application file for complete search history.

(56) References Cited

U.S. PATENT DOCUMENTS

| | | | |
|---|---|---|---|
| 1,522,333 A | 1/1925 | Schroeder | |
| 2,249,882 A * | 7/1941 | Buchanan | 62/505 |
| 2,662,195 A | 12/1953 | Fisher et al. | |
| 2,692,956 A | 10/1954 | Kaczor et al. | |
| 2,787,720 A | 4/1957 | Ethier et al. | |
| 3,089,969 A | 5/1963 | Wiedermann | |
| 4,300,066 A | 11/1981 | Butler, III | |
| 4,426,592 A | 1/1984 | Berzin et al. | |
| 4,531,357 A * | 7/1985 | Weber et al. | 60/785 |
| 5,271,248 A | 12/1993 | Crowe | |
| 6,009,722 A * | 1/2000 | Choi et al. | 62/505 |
| 6,087,746 A * | 7/2000 | Couvert et al. | 310/60 R |
| 6,218,747 B1 * | 4/2001 | Tsuruhara | 310/54 |
| 6,222,289 B1 * | 4/2001 | Adames | 310/54 |
| 6,355,995 B1 * | 3/2002 | Jeppesen | 310/52 |
| 6,882,068 B2 | 4/2005 | Weber et al. | |
| 2007/0216236 A1 * | 9/2007 | Ward | 310/54 |

* cited by examiner

*Primary Examiner*—Dang D Le
(74) *Attorney, Agent, or Firm*—Oral Caglar, Esq.

(57) ABSTRACT

A cooling system for an electrical motor or generator includes a first cooling loop, a second cooling loop, and a heat exchange system. The first cooling loop may extract heat from an iron stack and winding of the electrical motor or generator. The second cooling loop may extract heat from end turns of the stator winding, the rotor, and the bearings independently from and simultaneously to the first cooling loop. At least the first cooling loop may pass through the heat exchange system. A liquid coolant may circulate in the first cooling loop and a compressed gas, such as compressed air or compressed refrigerant in vapor form, may circulate in the second cooling loop. The cooling system and method for an electrical motor or generator may be suitable for, but not limited to, applications in the aircraft and aerospace industries, such as driving a cabin air compressor of an aircraft.

17 Claims, 3 Drawing Sheets

THERMAL AND SECONDARY FLOW MANAGEMENT OF ELECTRICALLY DRIVEN COMPRESSORS

BACKGROUND OF THE INVENTION

The present invention generally relates to electrically driven compressors and to the cooling of electrical motor/generators and, more particularly, to a system and method for optimized thermal and secondary flow management of electrically driven compressors.

Commercial jet aircraft fly at very high altitudes, and therefore, their cabin air systems must provide a safe, comfortable, and pressurized environment. Modern aircraft are often equipped with an environmental control system (ECS) where the fresh air for the cabin is provided by electrical motor-driven compressors in place of traditional engine bleed air. Cabin air compressors have a wide operating envelop. In order to have a reliable and long lasting system, it is essential to have a thermally stable components; this applies in particular to the electrical stator and rotor as well as the bearings. Generally, a considerable amount of heat is generated during the operation of an electrical motor or generator, and cooling the space between the rotor shaft and the stator, the rotor shaft and bearings, as well as the housing and stator, especially when the motor is operated at high speeds, is required. Frictional heating occurs as the rotor spins at high speed, but heating also occurs as electric current flows through the rotor and stator coils as they rotate relative to one another in the magnetic fields.

Therefore, electrically driven motors and generators are generally equipped with cooling systems, such as gas ventilation systems, to transfer heat from the stator and rotor. A gas ventilation system cools the rotor and stator by forcing cooling gas through gas passages in the rotor and stator. U.S. Pat. No. 2,692,956 and U.S. Pat. No. 2,787,720, for example, cool the rotor and stator with air.

It is further known in the art that electrical motors/generators may have one cooling system for the rotor element and another cooling system for the stator element. The two cooling systems are typically maintained separately from one another and each can be in a closed recirculation path. U.S. Pat. No. 3,089,969, for example, provides a cooling system for turbo-generators where the rotor space is sealed in a gas tight manner from the stator space and wherein the rotor is cooled by circulating cooling gas through the rotor element while the stator is cooled by circulating a cooling liquid, such as oil, through the stator element. The closed space occupied by the stator element is further filled with an incombustible gas, such as carbon dioxide or air, that is separated from the cooling liquid.

In another example, the space occupied by the rotor is sealed off from the space occupied by the surrounding stator element, which makes it possible to utilize a nonconductive liquid, such as oil, for cooling of the stator element and the winding placed therein. U.S. Pat. No. 5,271,248, for example, uses an oil loop to extract heat from the stator by conducting the heat from the stator core and winding to the oil. A separate refrigerant vapor loop is used to cool only low temperature electronics and not the electrical motor/generator.

While cooling a rotor with a cooling gas, such as air, may be effective for cooling a rotor, it may not be effective enough to cool a stator of a high power density electrical motor/generator to the desired operating temperatures. Furthermore, while wet-cooling a stator with a nonconductive cooling liquid, such as oil, may be effective for extracting the operational heat from the stator, the space surrounding the stator must be sealed off, for example, by using a bore-seal between the stator and rotor. This may increase the manufacturing cost of the electrical motor/generator as well as lowering the overall availability of the system due to inherent breakdown of sealing. Wet-liquid cooling the stator may also mean that a larger gap between the rotor and the stator is needed, which may result in a lower overall motor/generator efficiency and higher losses. An alternative to wet-liquid cooling the stator may be dry-liquid cooling the stator by using a cooling jacket that surrounds the iron stack and winding of the stator. In this case the end turns of the stator winding may need to be potted for cooling. Potting of end turns is not reliable since pieces can separate from the potting material and may fall into the rotating group, which can cause motor/generator seizure.

As can be seen, there is a need for a system and method for optimized thermal and secondary flow management of electrically driven compressors. Furthermore, there is a need for separation and optimal distribution of the thermal loads that occur during the operation of an electrical motor/generator, as well as for optimization of the cooling of rotor and stator elements to increase the overall cooling effectiveness of electrically driven compressors.

SUMMARY OF THE INVENTION

In one aspect of the present invention, a cooling system for an electrical motor or generator comprises a first cooling loop, a second cooling loop, and a heat exchange system. The first cooling loop extracts heat from an iron stack and winding of a stator of the electrical motor or generator. The second cooling loop extracts heat from end turns of a winding of the stator, a rotor, and bearings of the electrical motor or generator, the second cooling loop is independent from the first cooling loop, and the second cooling loop is operated simultaneously to the first cooling loop. At least the first cooling loop is a closed loop and passes through the heat exchange system.

In another aspect of the present invention, a cooling system of an electrically driven compressor comprises an electrical motor, a first cooling medium circulating in a first cooling loop, a second cooling medium flowing in a second cooling loop, a heat exchange system, and a pump. The electrical motor includes a cooling jacket in direct contact with an iron stack of a stator, a stator winding having end turns, a rotor, and bearings and drives the compressor. The first cooling medium is a water based liquid coolant that travels along the cooling jacket and indirectly extracts heat from the iron stack of the stator. The first cooling loop is a closed loop. The second cooling loop is independent from the first cooling loop and is operated simultaneously to the first cooling loop. The second cooling medium is a compressed gas that extracts heat from the end turns, the rotor, and the bearings through direct contact. The heat exchange system is an external system operated independently from the generator. The first cooling medium passes through the heat exchange system. The heat exchange system cools the first cooling medium. The pump offsets any pressure loss within the first cooling loop.

In a further aspect of the present invention, a method for cooling an electrically driven compressor comprises the steps of circulating a liquid coolant in a first closed cooling loop, extracting heat from an iron stack of a stator with the liquid coolant through indirect contact, cooling down the liquid coolant by passing the liquid coolant through an external heat exchange system, flowing a compressed gas in a second cooling loop independently and simultaneously from the liquid coolant, extracting heat from end turns of a winding of the stator, a rotor, and bearings with the compressed gas through direct contact.

These and other features, aspects and advantages of the present invention will become better understood with reference to the following drawings, description and claims.

DETAILED DESCRIPTION OF THE INVENTION

Figure 1:
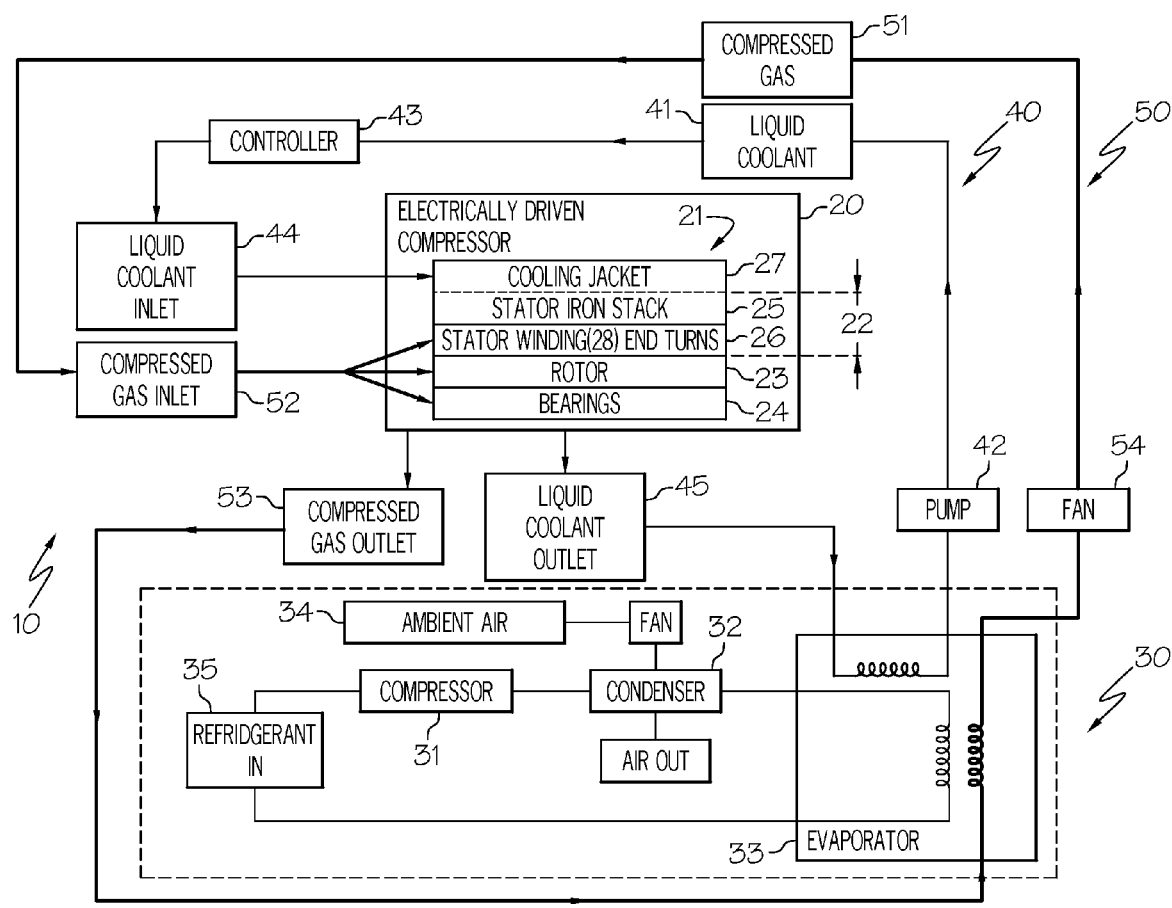
FIG. 1 is a block diagram schematically representing a cooling system of an electrically driven compressor according to an embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides a system and method for cooling an electrically driven compressor. In one embodiment the present invention provides a cooling system and method for an electrical motor or generator that is suitable for, but not limited to, applications in the aircraft and aerospace industries, such as driving a cabin air compressor of an aircraft. The cooling system and method as in one embodiment of the present invention may be suitable for, but not limited to, cooling a high speed alternating current (AC) permanent magnet electrical motor or generator running on air-foil bearings.

In contrast with the prior art, where the stator and the rotor are either both cooled with air, or where the stator is cooled with oil and the rotor with air, the cooling system as in one embodiment of the present invention combines dry-liquid cooling of the stator with compressed gas cooling, for example, with compressed air, of the stator winding end turns, the rotor, and the journal and thrust bearings. By utilizing such a two-phase cooling system that combines the benefits of air and liquid cooling as in one embodiment of the present invention, the overall cooling efficiency may be improved and the electrically driven compressor may be more compact and lightweight. Also, by including two independent cooling loops that may be operated simultaneously, as in one embodiment of the present invention, the thermal load of an electrical motor or generator may be separated and optimally distributed between the two independent cooling loops.

While wet-liquid cooling of the stator, where the stator is immersed in a cooling liquid such as oil, has been done efficiently in the prior art, such prior art cooling systems and methods may require a bore seal between the stator and the motor. Installing a bore seal may require a larger gap between the rotor and the stator of a motor or generator, which may lower the overall motor efficiency. Therefore, by dry-liquid cooling the iron stack of the stator as in one embodiment of the present invention, the prior art bore seal can be eliminated and the liquid cooling medium may include water or aqueous solutions, since the liquid cooling medium as in one embodiment may be only used to run over a cooling jacket, which may be in direct contact with the iron stack of the stator, and will not get in contact with the rotor or the stator winding end turns.

In further contrast to the prior art, where the stator winding end turns are either insulated if cooled in direct contact with a cooling liquid, such as oil, or where the end turns are potted in case of dry-liquid cooling of the stator using a cooling jacket and a liquid coolant, the stator end turns may be cooled in the same phase as the rotor using compressed air as in one embodiment of the present invention. Using compressed air to cool the stator end turns as in one embodiment of the present invention is more reliable and effective than potting the end turns, since pieces may separate from potting material, for example, due to chipping or vibrating, and fall into rotating parts causing damage.

In a further contrast to the prior art, the cooling system as in one embodiment of the present invention uses an external heat exchange system that may be, for example, a vapor cycle system, to take the heat out of the cooling media, the cooling liquid and the compressed air, after leaving the compressor. Since the cooling system as in one embodiment of the present invention may be a closed loop system, the cooling media may be used again for cooling the electrical motor or generator.

Referring now to FIG. 1, a block diagram schematically representing a cooling system 10 for an electrically driven compressor 20 is illustrated according to an embodiment of the present invention. The cooling system 10 may include a heat exchange system 30. The cooling system 10 may further include two independent cooling loops that may be operated simultaneously; a first cooling loop 40 and a second cooling loop 50.

The electrically driven compressor 20 may be, for example, a cabin air compressor of an aircraft. The compressor 20 may be electrically driven, for example, by a high-speed alternating current (AC) permanent magnet electrical motor 21. The electrical motor 21 may include a stator 22, and a rotor 23 and may run on journal bearings 24. The journal bearings 24 may be air-foil bearings. The stator 22 may include an iron stack 25 and a winding 28 including end turns 26. A cooling jacket 27 may be mounted on the outside of the iron stack 25 of the stator 22 and may be in contact with the iron stack 25 and the cooling housing 12 (shown in FIG. 2). The electrical motor 21 may be any type of electrical motor or generator.

The heat exchange system 30 may be, for example, a vapor cycle system, as shown in FIG. 1, and may provide single-stage compressed vapor refrigeration. The heat exchange system may be an external system, which may be separated from the electrically driven compressor 20, may be positioned outside of the compressor 20, and may be operated independently from the compressor 20. The heat exchange system 30 may include a compressor 31, a condenser 32, and an evaporator 33. The condenser may be air-cooled (as shown in FIG. 1) by using ambient air 34 or may be water-cooled. A circulating refrigerant 35, such as Freon®, may enter the compressor 31 as a vapor. The compressed refrigerant 35 in vapor form may then travel through the condenser 32 where the vapor may condense into a liquid by removing heat. The cold refrigerant 35 in mainly liquid form may now travel through the evaporator 33 and may be completely vaporized by cooling the heated cooling media 41 and 51, which may be circulating in the first cooling loop 40 and the second cooling loop 50 of the cooling system 10, respectively. The heated cooling media 41 and 51 may be cooled down by passing through the evaporator 33. The refrigerant 35 in vapor form may return to the inlet of the compressor 31 completing the refrigeration cycle of the heat exchange system 30.

The heat exchange system 30 may also be, for example, an air cycle system (not shown), where the heat exchange may take place in an conventional air to air or air to liquid heat exchanger using the cold air from turbine discharge of an aircraft air conditioning system. The heat exchange system 30 may further be, for example, a ram air cycle system where the heat exchange may take place in a conventional heat exchanger using ram air (outside air) that may be taken in while an aircraft is flying. Using the ram air system as the heat exchange system 30 may have the disadvantage that the ram air intake may increase the drag on the aircraft and may increase the fuel consumption. Furthermore, the heat exchange system 30 may further be a combination of the vapor cycle system, the air cycle system, and the ram air cycle system. Using a vapor cycle system, as shown in FIG. 1, as heat exchange system 30 may be the most effective for taking the heat out of the first cooling loop 40 and the second cooling loop 50 of the cooling system 10 by incorporating the vapor/liquid/vapor phase change of the refrigerant 35. Due to the phase change of the refrigerant 35, the heat exchange rate may be higher compared to air to air or air to liquid heat exchanger systems 30. Therefore, devices used to take the heat out of the first cooling loop 40 and the second cooling loop 50 may be smaller while transmitting the same amount of heat using the vapor cycle system compared to the air cycle system or the ram air cycle system.

Still referring to FIG. 1, the first cooling loop 40 may use a liquid coolant 41 as a cooling medium. The liquid coolant 41 may circulate in the first cooling loop 40 to dry-liquid cool the iron stack 25 and the winding 28 of the stator 22. The liquid coolant may be any liquid including water in contrast to the prior art, which is often limited to oil. The liquid coolant 41 may be a water-based liquid coolant, for example, a propylene glycol water (PGW) coolant that may contain about 60% propylene glycol and about 40% water. The liquid coolant 41 may travel along the cooling jacket 27, for example, in a single series path or in two or more parallel paths, and, therefore, the first cooling loop 40 may be used to extract heat from iron stack 25 of the stator 22 and partially from the stator winding 28.

As shown in FIG. 1, in the first cooling loop 40, the cooled liquid coolant 41 may be supplied through a liquid coolant inlet 44 to the cooling jacket 27, which may be in contact with the iron stack 25 of the stator. The liquid coolant 41 may circulate along the cooling jacket 27, but may not get in direct contact with the iron stack 25 of the motor 21 or any other part of the motor 21. After circulating along the cooling jacket 27 and indirectly extracting the heat from the iron stack 25 and the winding 28 of the stator 22 through the cooling jacket 27, the heated liquid coolant 41 may exit the motor 21 and, therefore, the electrically driven compressor 20, through a liquid coolant outlet 45. The heated liquid coolant 41 may now enter and pass through the heat exchange system 30, for example, through the evaporator 33. The heat exchange system 30 may take the heat out of the liquid coolant 41, the cooling medium circulating in the first cooling loop 40. The cooling loop 40 may also include a pump 42. The pump 42 may be positioned in the first cooling loop 40 to receive the cooled liquid coolant 41 after leaving the heat exchange system 30. The pump 42 may be used to offset any pressure loss within the first cooling loop 40.

Additionally the cooling loop 40 may pass through a controller module 43 (shown in FIG. 1). The controller module 43 may house electronic equipment used for controlling the electrical motor or generator 21, which may due to inefficiencies of the electronics used generate an amount of heat that is comparable to the amount of heat generated by the electrical motor 21. The controller module 43 may be positioned in series with the electrical motor 21, for example, between the pump 42 and the liquid coolant inlet 44 (as shown in FIG. 1), such that the liquid coolant 41 may enter the controller module 43 for removing the generated heat. The controller module 43 may further be positioned in series with the electrical motor 21, for example, between the liquid coolant outlet 45 and the heat exchange system 30 (not shown) or may be arranged in parallel with the electrical motor 21 (not shown). Alternatively, the controller module 43 may be installed in series or parallel to the electrical motor 21 in the cooling loop 51. Since cooling the electronics housed by the controller module 43 may not be as effective using a compressed gas 51, such as pressurized air, compared to using a liquid coolant 41, a controller module 43 used in the cooling loop 50 may need to be bulkier than a controller module 43 used in the cooling loop 40.

The first cooling loop 40 may be a closed loop and the liquid coolant cooled by the heat exchange system 30 may reenter the compressor 20 through the liquid coolant inlet 44.

Still referring to FIG. 1, the second cooling loop 50 may use a compressed gas 51 as a cooling medium. The compressed gas 51 may circulate in the second cooling loop 50. The compressed gas 51 may be, for example, cooled compressed air from an electrically driven compressor 20, such as a cabin air compressor of an aircraft, or compressed refrigerant in vapor form taken from a vapor cycle compressor. Pressurized cooling air may be directly bled from a cabin air compressor outlet. Pressurized cooling air may further be extracted, for example, from the return cabin air duct of a cabin air compressor of an aircraft. In this case, the compressed gas 51 in form of pressurized air may not need to pass through the heat exchange system 30, since the pressurized air 51 may have already passed through the loop 30 before entering, for example, the cabin of an aircraft.

In the second cooling loop 50, the compressed gas 51 may pass through the motor 21 along a cooling flow path 55 (shown in FIG. 2), for example, around the rotor 23, and through the journal bearings 24. To enhance the cooling of the stator winding 28, the cooled compressed gas 51 may be used to remove heat by direct contact from the end turns 26 of the stator winding 28. The cooled compressed gas 51 may further remove heat by directly contacting the body of the rotor 23 and the journal bearings 24.

As shown in FIG. 1, in the second cooling loop 50, the cooled compressed gas 51 may be supplied through a compressed gas inlet 52 to the interior space of the electrical motor 21. After extracting the heat, which may be generated during the operation of the electrical motor 21, from the end turns 26 of the stator winding 28, the rotor 23, and the journal bearings 24 through direct contact, the heated compressed gas 51 may exit the motor 21 and, therefore, the electrically driven compressor 20, through a compressed gas outlet 53. The heated compressed gas 51 may now enter and pass through the heat exchange system 30, for example, through the evaporator 33. The heat exchange system 30 may take the heat out of the compressed gas 51, the cooling medium circulating in the second cooling loop 50. The cooling loop 50 may be a closed loop, as shown in FIG. 1. If the cooling loop 50 is a closed loop, the cooling loop 50 may include a fan 54. The fan 54 may be positioned in the second cooling loop 50 between the heat exchange system 30 and the compressed gas inlet 52. For example, the fan 54 may be positioned between the outlet of the evaporator 33 and the compressed gas inlet 52. The fan 54 may be used to offset any pressure loss within the second cooling loop 50. If the second cooling loop 50 is a closed loop, the compressed gas 51 cooled by the heat exchange system 30 may reenter the compressor 20 through the compressed gas inlet 52. The cooling loop 50 may further be an open loop (not shown). In this case, the compressed gas 51 may be discharged to ambient surroundings from the compressed gas outlet 53. If the cooling loop 50 is an open loop, the heated compressed gas 51 leaving the electrically driven compressor 20 may not enter and pass through the heat exchange system 30. Furthermore, if the cooling loop 50 is an open loop no fan 54 may be included.

Figure 2:
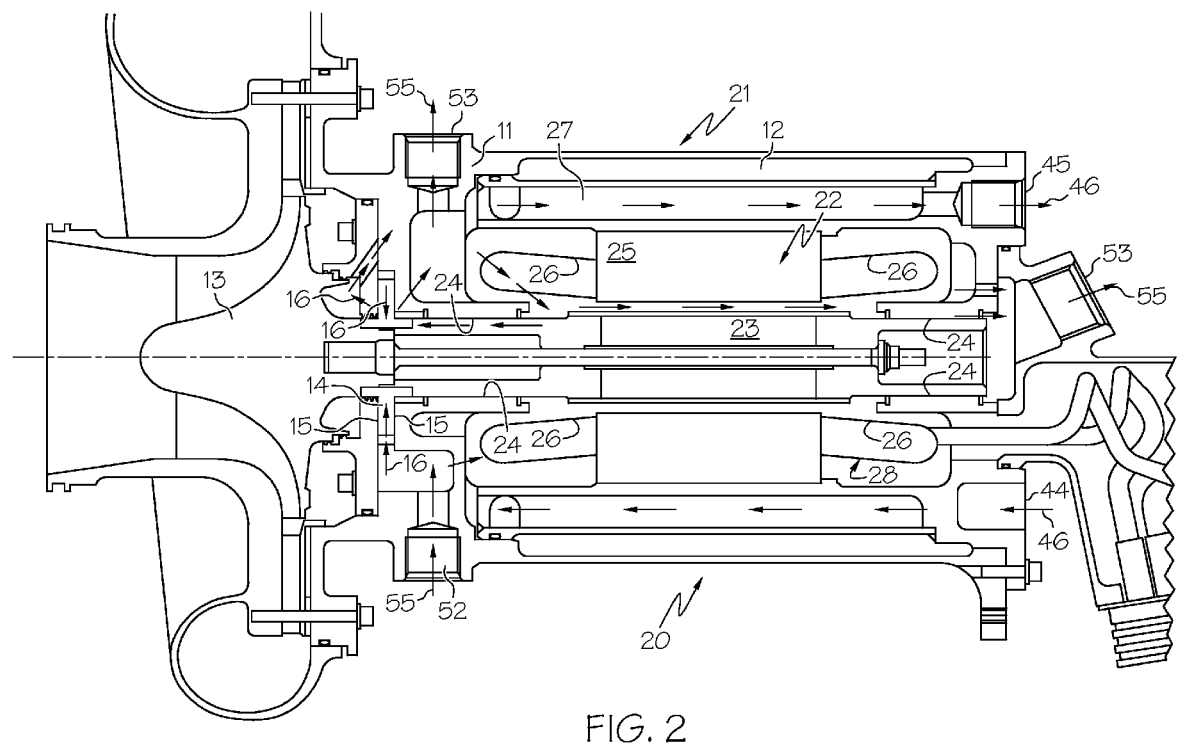
FIG. 2 is a cross-sectional view of an electrically driven compressor according to an embodiment of the present invention.

Referring now to FIG. 2, a cross-sectional view of an electrically driven compressor 20 is illustrated according to an embodiment of the present invention. Also shown in FIG. 2 are the cooling flow path 46 of the liquid coolant 41 and the cooling flow path 55 of the compressed gas 51 inside the compressor 20. The compressor 20 may include a compressor housing 11, a cooling housing 12, a compressor wheel 13, a thrust plate 14 including thrust bearings 15, and the electrical motor 21.

As can be seen in FIG. 2, the cooling flow path 46 of the liquid coolant 41 may start with the liquid coolant 41 entering the cooling jacket 27 and, therefore, the motor 21 leaving the compressor 20, through the cooled liquid coolant inlet 44. The liquid coolant 41 may travel along the cooling jacket 27 extracting the heat from the stator iron stack 25 and partially from the stator winding 28 before leaving the cooling jacket 27, and therefore, the motor 21 leaving the compressor 20 through the liquid coolant outlet 45. The liquid coolant inlet 44 and the liquid coolant outlet 45 may be incorporated in the cooling housing 12. It may be possible to incorporate more than one liquid coolant inlet 44 into the first cooling loop 40 of the cooling system 10. It may further be possible to incorporate more than one liquid coolant outlet 45 into the first cooling loop 40 of the cooling system 10.

The cooling flow path 55 of the compressed gas 51 may start with the compressed gas 51 entering the interior space of the motor 21 that may drive the compressor 20 through the compressed gas inlet 52. The compressed gas 51 may flow through the interior space of the compressor 20 thereby coming in direct contact with the end turns 26 of the stator winding 28, the outer diameter of the rotor 23, and the journal bearings 24 before exiting the interior space of the motor 21 driving the compressor 20 through the compressed gas outlet 53. The compressed gas inlet 52 and the compressed gas outlet 53 may be incorporated in the compressor housing 11 and the cooling housing 12. More than one compressed gas inlet 52 may be used in the second cooling loop 50 of the cooling system 10. It may further be possible to incorporate more than one compressed gas outlet 53 into the second cooling loop 50 of the cooling system 10. Furthermore, as illustrated in FIG. 2, the cooling flow path 55 of the compressed gas through the motor 21 may be combined with the bearing cooling flow path 16 passing through the thrust bearings 15 of the compressor 20.

Figure 3:
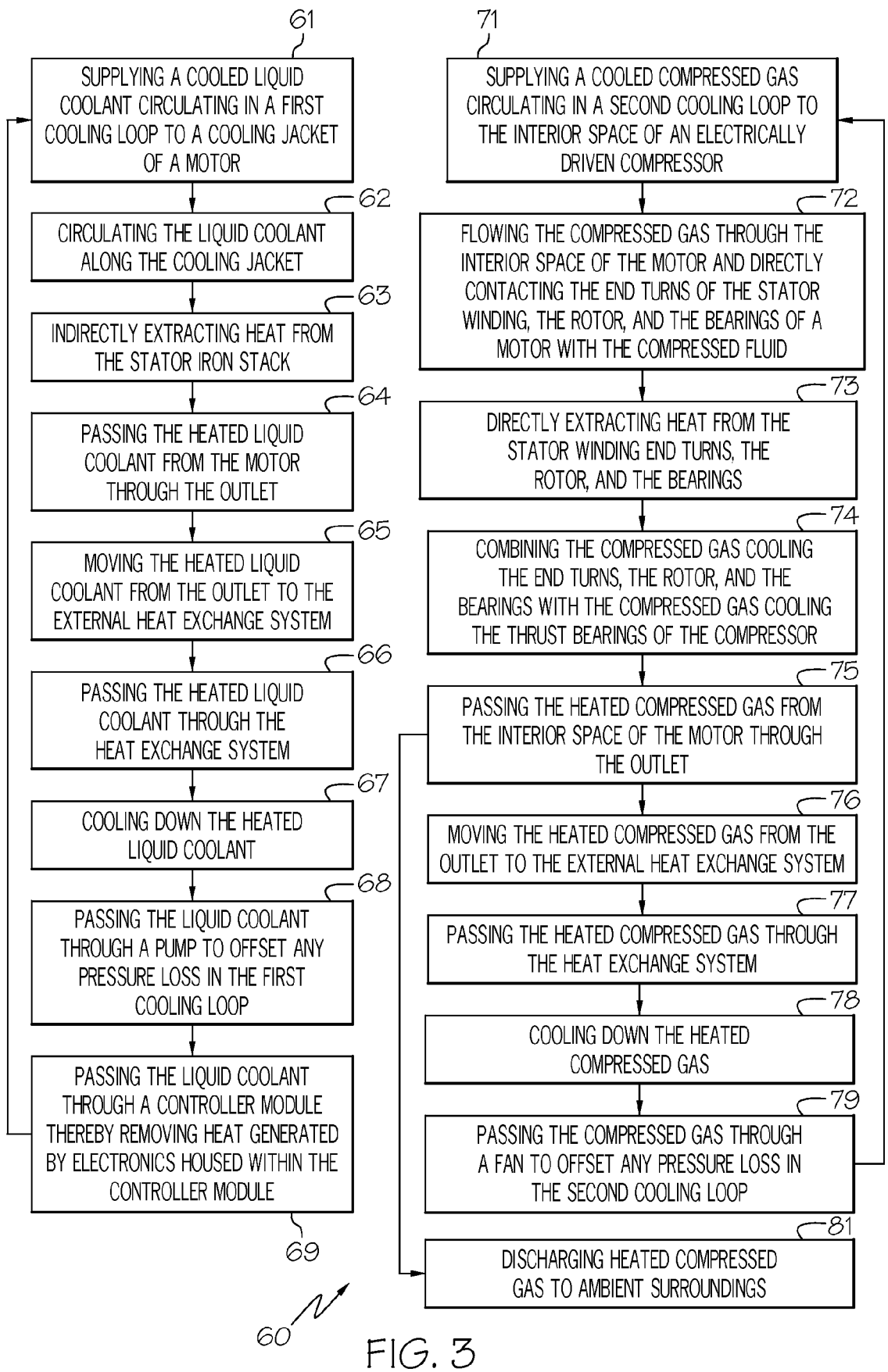
FIG. 3 is a flow chart schematically representing a method for cooling an electrically driven compressor according to an embodiment of the present invention.

Referring now to FIG. 3, a flow chart schematically representing a method 60 for cooling an electrically driven compressor 20 is illustrated according to an embodiment of the present invention. Method 60 may involve a step 61 where a cooled liquid coolant 41, such as a propylene glycol water coolant, circulating in a first cooling loop 40 may be supplied to a cooling jacket 27 of an electrical motor or generator 21. The liquid coolant 41 may be circulated along the cooling jacket 27, which may be in direct contact with the iron stack 25 of the stator 22, in a step 62. By circulating along the cooling jacket 27 in step 62, the liquid coolant 41 may extract heat from the stator iron stack 25 and partially from the stator winding 28, in a step 63. In a step 64, the heated liquid coolant 41 may exit the electrical motor 21 and, therefore, the compressor 20.

A step 65 may involve moving the heated liquid coolant 41 from the liquid coolant outlet 45 to the heat exchange system 30. The heated liquid coolant 41 may pass through the external heat exchange system 30 in a step 66. Thereby, the heated liquid coolant 41 may be cooled down in a step 67. In a step 68, the now cooled liquid coolant 41 may pass through a pump 42 to offset any pressure loss that may have occurred within the first cooling loop 40.

A step 69 may involve passing liquid coolant 41 that circulates within the first cooling loop 40 through the controller module 43 thereby removing heat generated by electronics, which may be housed within the controller module 43 and may be used to control the electrical motor 21. Supplying the liquid coolant 41 to the cooling jacket 27 in step 61 may close the first cooling loop 40.

Method 60 may further involve a step 71 where a cooled compressed gas 51, such as compressed air, circulating in a second cooling loop 50 may be supplied to the interior space of the electrically driven compressor 20. The compressed gas 51, such as compressed air, may be directly bled from the electrically driven compressor 20, such as a cabin air compressor of an aircraft or may be extracted from the return cabin air duct, for example, of an aircraft. The compressed gas 51 may become in direct contact with the end turns 26 of the stator winding 28, the outer diameter of the rotor 23, and the journal bearings 24 while flowing through the interior space of the motor 21 in a step 72. Thereby the compressed gas 51 may directly extract heat generated during the operation of the motor 21 from the end turns 26 of the stator winding 28, the outer diameter of the rotor 23, and the journal bearings 24 in a step 73. The compressed gas 51 cooling the end turns 26, the rotor 23, and the journal bearings 24 may be combined with the compressed gas 51 cooling the thrust bearings 15 of the compressor 20 in a step 74. In a step 75, the now heated compressed gas 51 may exit the motor 21 and, therefore, the compressor 20 through the compressed gas outlet 53. If the second cooling loop 50 is an open loop, the heated compressed gas 51 exiting the motor 21 through the compressed gas outlet 53 (step 75) may be discharged to ambient surroundings in a step 81.

If the cooling loop 50 is a closed loop, a step 76 following step 75 may involve moving the heated compressed gas 51 from the compressed gas outlet 53 to the external heat exchange system 30. The heated compressed gas 51 may pass through the heat exchange system 30 in a step 77. Thereby, the heated compressed gas 51 may be cooled down in a step 78. In a step 79, the now cooled compressed gas 51 may pass through a fan to offset any occurred pressure loss. Supplying the cooled compressed gas 51 to the interior space of the electrically driven compressor 20 in step 71 may close the second cooling loop 50.

Steps 61 to 69 and steps 71 to 79 or, alternatively, steps 71-75 and 81 may take place simultaneously and independently from each other. By combining steps 61 to 69, which involve dry-liquid cooling of the stator iron stack 25 and partially of the stator winding 28, and steps 71 to 79 or, alternatively, steps 71-75 and 81, which may involve cooling the end turns 26 of the winding 28, the rotor 23, and the journal bearings 24 with a compressed air, the thermal load of the electrical motor 21 may be separated and optimally distributed resulting in an effective method 60 for cooling an electrically driven compressor 20. Application of method 60 may further allow manufacturing a compact and lightweight electrically driven compressor 20.

It should be understood, of course, that the foregoing relates to exemplary embodiments of the invention and that modifications may be made without departing from the spirit and scope of the invention as set forth in the following claims.

We claim:

1. A cooling system for an electrical motor or generator, comprising:
    a first cooling loop including a cooling jacket wherein a liquid coolant circulates along said cooling jacket, wherein said first cooling loop extracts heat the cooling jacket from an iron stack and a winding of a stator of said electrical motor or generator and wherein said cooling jacket is in direct contact with said iron stack;
    a second cooling loop, wherein said second cooling loop extracts heat from end turns of said winding of said stator, a rotor, and bearings of said electrical motor or generator, wherein said second cooling loop is independent from and disconnected to said first cooling loop, and wherein said second cooling loop is operated simultaneously to said first cooling loop;
    a compressed gas as a cooling medium, wherein said compressed gas flows in said second cooling loop and extracts heat through direct contact with said stator winding end turns, said rotor, and said bearings wherein said stator winding end turns are unpotted; and
    a heat exchange system, wherein at least said first cooling loop is a closed loop and passes through said heat exchange system.

2. The cooling system of claim 1, further comprising a water based liquid coolant as a cooling medium, wherein said liquid coolant circulates in said first cooling loop.

3. The cooling system of claim 1, wherein said heat exchange system is an external system operated independently from said electrical motor or generator.

4. The cooling system of claim 1, wherein said heat exchange system is a vapor cycle system and provides compressed vapor refrigeration to cooling media circulating in said first cooling loop and in said second cooling loop.

5. The cooling system of claim 1, wherein said heat exchange system is a vapor cycle system, an air cycle system, a ram air cycle system, or a combination thereof.

6. The cooling system of claim 1, further comprising a pump and a controller module both integrated in said first cooling loop, wherein said pump offsets any pressure loss within said first cooling loop, and wherein said first cooling loop removes heat generated by electronics housed within said controller module.

7. The cooling system of claim 1, further comprising a fan integrated in said second cooling loop, wherein said second cooling loop is a closed loop, and wherein said fan offsets any pressure loss within said second cooling loop.

8. A cooling system of an electrically driven compressor, comprising:
    an electrical motor, wherein said electrical motor includes a cooling jacket in direct contact with an iron stack of a stator, a stator winding having unpotted end turns, a rotor, and journal bearings, wherein said electrical motor drives said compressor;
    a first cooling medium circulating in a first cooling loop, wherein said first cooling loop is a closed loop, wherein said first cooling medium is a water based liquid coolant, wherein said liquid coolant travels along said cooling jacket, and wherein said liquid coolant indirectly extracts heat from said iron stack and said winding of said stator;
    a second cooling medium flowing in a second cooling loop, wherein said second cooling loop is disconnected and independent from said first cooling loop, wherein said second cooling loop is operated simultaneously to said first cooling loop, wherein said second cooling medium is a compressed gas, and wherein said compressed gas extracts heat from said end turns by direct contact, said rotor, and said journal bearings through direct contact;
    a heat exchange system, wherein said heat exchange system is an external system operated independently from said generator, wherein said first cooling medium passes through said heat exchange system, and wherein said heat exchange system cools said first cooling medium; and
    a pump, wherein said pump offsets any pressure loss within said first cooling loop.

9. The cooling system of claim 8, further including a fan, wherein said second cooling loop is a closed loop, wherein said fan offsets any pressure loss within said second cooling loop, wherein said second cooling medium passes through said heat exchange system, and wherein said heat exchange system cools said second cooling medium.

10. The cooling system of claim 8, wherein said first cooling medium is a propylene glycol water coolant that contains about 60% propylene glycol and about 40% water.

11. The cooling system of claim 8, wherein said second cooling medium is compressed air directly bled from an outlet of an air compressor or extracted from a return cabin air duct.

12. The cooling system of claim 8, wherein said second cooling medium is compressed refrigerant in vapor form taken from a vapor cycle compressor.

13. The cooling system of claim 8, wherein said compressor includes thrust bearings, wherein said thrust bearings are cooled with said compressed gas traveling along a bearing cooling flow path, and wherein said bearing flow path is combined with said second cooling loop.

14. A method for cooling an electrically driven compressor, comprising the steps of:
    circulating a liquid coolant in a first closed cooling loop;
    extracting heat from an iron stack and winding of a stator with said liquid coolant through indirect contact;
    cooling down said liquid coolant by passing said liquid coolant through an external heat exchange system;
    flowing a compressed gas in a second cooling loop independently and simultaneously from said liquid coolant wherein said first cooling loop is not connected to said second cooling loop; and
    extracting heat from end turns of said winding of said stator, a rotor, and bearings with said compressed gas through direct contact of the compressed air in said second cooling loop.

15. The method for cooling of claim 14, further including the steps of:
    operating said second cooling loop as a closed loop;
    cooling down said compressed gas by passing said compressed gas through said heat exchange system;
    offsetting pressure loss in said first closed cooling loop by passing said liquid coolant through a pump after cooling down; and
    offsetting pressure loss in said second cooling loop by passing said compressed gas through a fan after cooling down.

16. The method for cooling of claim 14, further including the steps of:
    circulating said liquid coolant along a cooling jacket, wherein said cooling jacket is in direct contact with said iron stack of said stator;

passing said liquid coolant through a controller module integrated in said first cooling loop;

removing heat generated by electronics housed within said controller module using said liquid coolant; and combining said second cooling loop with a bearing cooling flow path passing through thrust bearings of said compressor.

17. The method for cooling of claim 14, further including the steps of:

taking pressurized air from an air return channel of said compressor, and circulating said compressed air in said second cooling loop.

* * * * *